United States Patent
Lind

[15] 3,690,785
[45] Sept. 12, 1972

[54] SPRING PLATE SEALING SYSTEM

[72] Inventor: LeRoger J. Lind, Minneapolis, Minn.

[73] Assignee: Westinghouse Electric Corporation, Pittsburgh, Pa.

[22] Filed: Dec. 17, 1970

[21] Appl. No.: 99,095

[52] U.S. Cl. ................415/108, 415/178, 415/219, 277/26
[51] Int. Cl.........F01d 11/02, F01d 25/24, F02f 5/00
[58] Field of Search......415/219, 108, 134, 135, 137, 415/138, 177, 131, 178; 277/23, 26, 53, 55, 56

[56] References Cited

UNITED STATES PATENTS

| 1,708,044 | 4/1929 | Baumann | 277/26 |
| 1,778,014 | 10/1930 | Baumann | 277/26 |
| 1,831,224 | 11/1931 | Baumann | 277/26 |

FOREIGN PATENTS OR APPLICATIONS

| 451,272 | 10/1927 | Germany | 277/53 |
| 221,632 | 9/1924 | Great Britain | 415/138 |
| 225,936 | 12/1924 | Great Britain | 277/53 |
| 291,604 | 9/1953 | Switzerland | 415/108 |
| 1,446,923 | 6/1966 | France | 277/56 |
| 409,720 | 6/1942 | Italy | 415/134 |

Primary Examiner—Henry F. Raduazo
Attorney—A. T. Stratton, F. P. Lyle and F. Cristiano, Jr.

[57] ABSTRACT

Sealing means for the ends of an enclosure defined between essentially concentric cylindrical members having different thermal expansion properties, characterized in that the sealing means is formed from segments each comprising a plate having a generally L-shaped cross section with one leg of the cross section being attached to one of the concentric members and the other leg, at right angles to the first, being spring-biased against a radially extending surface on the other member. The sealing means of the invention is designed to operate at high temperatures and will withstand large transient thermal growth differences in areas where rigid attachment of sealing elements to both members is impractical.

9 Claims, 7 Drawing Figures

Patented Sept. 12, 1972

SPRING PLATE SEALING SYSTEM

BACKGROUND OF THE INVENTION

While not limited thereto, the present invention finds particular utility in gas turbines employing high turbine inlet temperatures which require air cooling systems. Turbines of this type are usually provided with an outer, generally cylindrical casing divided in a horizontal plane with upper and lower halves bolted together for ease of assembly and service. Within the outer casing is an inner, generally cylindrical casing which carries, on its inner periphery, stationary turbine blades. Pressurized cooling air or another suitable cooling fluid is directed into the annular plenum chamber or space between the inner and outer casings and then through the stationary turbine blades.

Providing sealing means at the opposite ends of a plenum chamber of this type is exceedingly difficult, particularly in cases where high turbine inlet temperatures are employed. The inner and outer casings expand or contract due to thermal forces at different rates, particularly during startup and shutdown. As a consequence, the relative positions of points on the inner and outer casings vary greatly from transient to steady-state conditions, making it difficult to join one casing to the other with an effective seal of sufficient strength to withstand the relative growth differences.

SUMMARY OF THE INVENTION

In accordance with the present invention, radially extending sealing means for the ends of an enclosure defined between essentially concentric cylindrical members is provided comprising at least one sealing member of generally L-shaped cross section having a first leg portion secured to one of the cylindrical members and a second leg portion at substantially right angles to the first leg portion and engaging at its end a radially extending surface on the second cylindrical member. A second sealing member, also of generally L-shaped cross-sectional configuration, has a first leg portion secured to the other cylindrical member and a second leg portion at substantially right angles to the first leg portion and engaging at its end a radially extending surface of the first member. The first leg portions of the sealing members, which are normally longer than the second leg portions at right angles thereto, are preset whereby the second leg portions will be urged under spring tension into engagement with their associated radial surfaces. The respective leg portions of the L-shaped cross sections are parallel to each other and define a chamber therebetween.

In a gas turbine, for example, a plurality of segmented or arcuate sealing members of the type described above are circumferentially spaced around the turbine in the space between the inner and outer cylindrical casings. The seams between these arcuate segments are covered by sealing strips which, while they will not provide an absolute air-tight seal, will nevertheless afford sufficient sealing capability for the purpose intended.

A pair of sealing members of the type described above can be used alone or in combination with additional sets of sealing members of progressively smaller size arranged in parallel with the first set.

The above and other objects and features of the invention will become apparent from the following detailed description taken in connection with the accompanying drawings which form a part of this specification, and in which.

Figure 1:
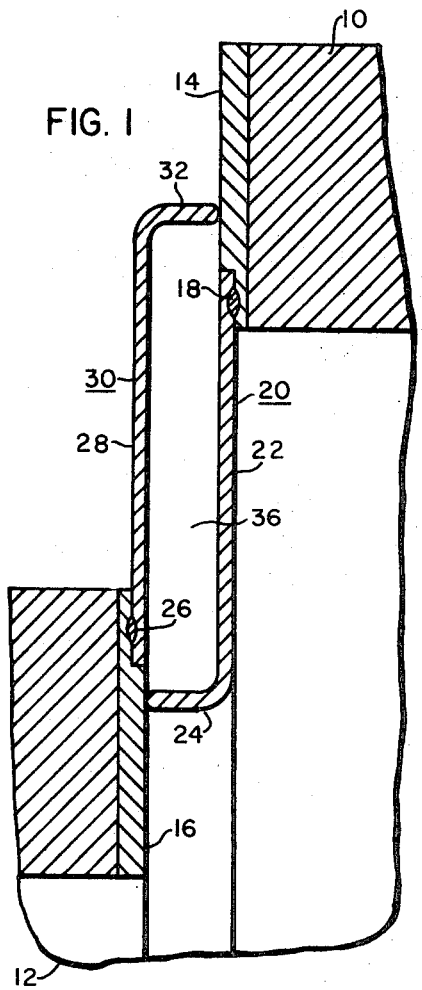
FIG. 1 is a cross-sectional view illustrating the basic sealing configuration of the invention.
Figure 2:
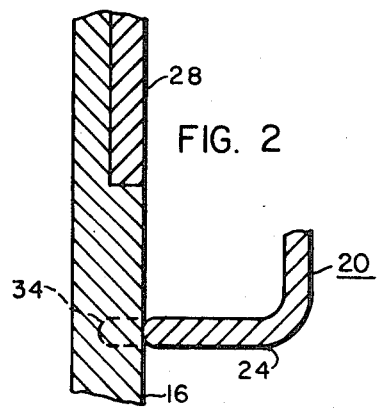
FIG. 2 is a broken-away sectional view showing the manner in which the sealing members are preset so as to be urged into sealing engagement under spring tension.

With reference now to the drawings, and particularly to FIGS. 1 and 2, there is shown an outer tubular member 10 and a cooperating inner tubular member 12 which are radially spaced with respect to each other. Both members 10 and 12 are preferably cylindrical in cross section, however, and are provided with circular wearplates 14 and 16, respectively. Wearplate 14, for example, is provided with an annular recess 18 within which is spot-welded one leg of a generally L-shaped sealing element 20. As shown, the element 20 has a cross section defining a first relatively long leg portion 22 which is welded in the recess 18 and a second, shorter leg portion 24 at right angles thereto. The tip of leg portion 24, in turn, engages the wearplate 16 on the other or inner cylindrical member 12.

Similarly, the wearplate 16 is provided with an annular recess 26 to which is spot-welded a cross-sectional leg portion 28 of a second sealing element 30. Element 30 also includes a second leg portion 32 at right angles to the first leg portion 28 and engages at its tip the wearplate 14.

As shown in FIG. 2, the leg portions 22 and 28 are preset or bent such that if the tip of leg portion 24, for example, did not engage the wearplate 16, it would assume the dotted-line position indicated by the reference numeral 34. This preset, of course, insures that the tip of leg portion 24, or leg portion 32, will be held in snug abutting relationship with wearplate 16 or 14, as the case may be.

The sealing elements 20 and 30 are preferably formed from flat plates which are spun into the desired shape, after which they are segmented according to design requirements. The segmented construction will hereinafter be described in connection with FIGS. 3 and 4. These spun parts are then welded to the wearplates 14 and 16 to provide a space 36 between the two which may be occupied by air or suitable insulation, not shown. The preset indicated by the broken line 34 in FIG. 2 must be long enough to prevent separation of the contact edge of leg portion 24 from the contact surface of wearplate 16, for example, during the complete temperature and loading cycle.

Figure 3:
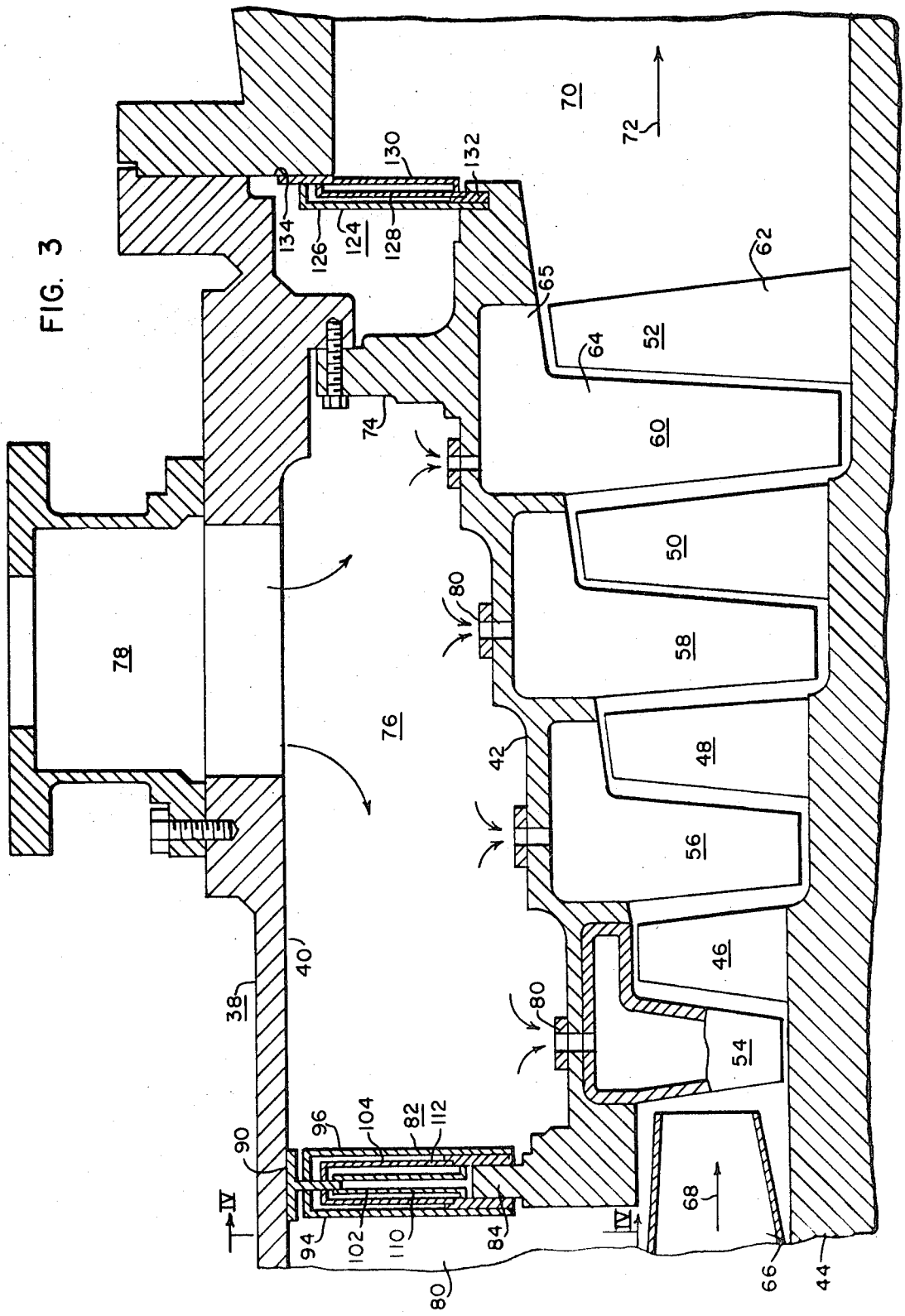
FIG. 3 is a vertical axial-sectional view of a portion of a gas turbine showing the manner in which the sealing means of the invention may be interposed between the inner and outer casings of the turbine.
Figure 4:
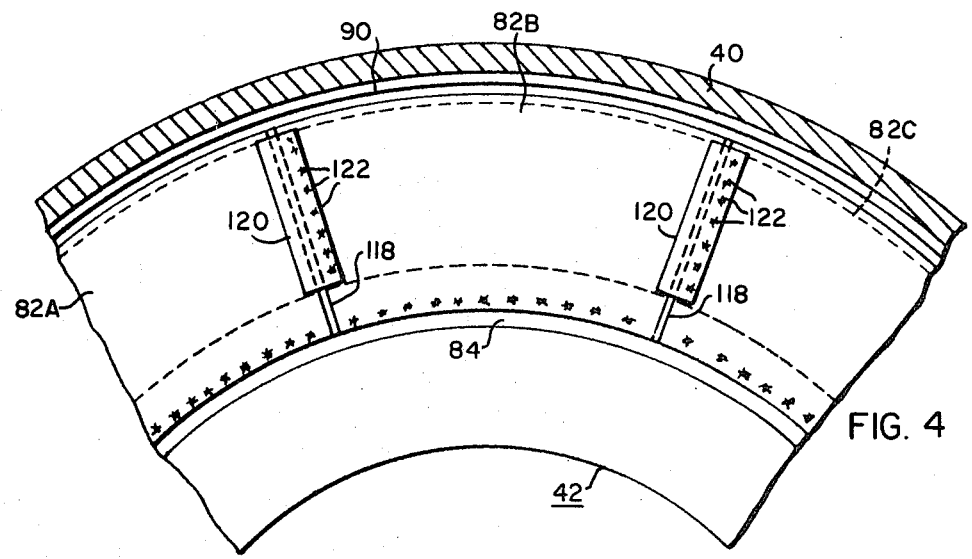
FIG. 4 is an end view of the sealing means of the invention taken substantially along line IV—IV of FIG. 3.

With reference now to FIGS. 3 and 4, the use of the sealing means of the invention in a gas turbine is shown. Only the upper half of the turbine is shown since the lower half is identical to the upper half. The turbine 38 comprises an outer casing 40 of generally cylindrical or tubular shape, an inner casing 42 of generally cylindrical shape encompassed by the outer casing 40 and a rotor 44 rotatably supported within the inner casing 42 in any suitable manner and having a plurality of annular rows or arrays of blades 46, 48, 50 and 52.

Cooperatively associated with the rotor blades 46–52 to form four stages for motive fluid expansion is an equal number of blade diaphragms or annular rows of stationary blades 54, 56, 58 and 60 supported within the inner casing 42.

The rotor blades 46–52 are substantially similar to each other except for a gradual increase in height from left to right and are of the unshrouded type with a radially outwardly extending vane portion 62 and a root portion suitably secured to the rotor 44. The root portions of the blades and the manner in which they are connected to the rotor 44 are not illustrated in FIG. 3; however those skilled in the art will readily appreciate the manner in which the connection is made. In a similar manner, the stationary blades 54–60 are substantially similar to each other but gradually increase in height from left to right and are provided with a radially inwardly extending vane portion 64 and a shroud portion 65 secured to the inner wall surface of the inner casing 42. Here, again, the manner in which the stationary blades are secured to the inner casing 42 is not shown in detail.

Hot motive fluid, such as pressurized combustion gas generated in a suitable fuel combustion chamber, not shown, is directed through an inlet passageway 66 past the stationary blades and rotor blades, in the direction indicated by the arrow 68, with the resulting expansion of the motive fluid rotating the rotor 44 about its longitudinal axis. The expanded gas is then directed through a suitable outlet or exhaust cylinder 70 as indicated by the arrow 72.

The inner casing 42 is secured to the outer casing 40 by means of radially extending arms 74, it being understood that both the inner and outer casings 42 and 40 are stationary and do not rotate. Intermediate the casings 42 and 40 is an annular plenum chamber 76 into which air or other suitable fluid is forced through opening 78. The compressed air circulates around the plenum chamber 76 and then flows through openings 80 in the inner casing 42 into the hollow interiors of the stationary blades 54–60 and out of openings, not shown, in the blade tips. The purpose of the plenum chamber 76 and the hollow blade construction, of course, is to cool the blades which are exposed to the hot gases of combustion. The plenum chamber 76 must be isolated from the exhaust cylinder 70 as well as the space 80 which contains the aforesaid combustion chamber. Furthermore, the pressure and temperature of the gas within the plenum chamber 76 will be substantially different than that in the chambers ahead and behind it. Consequently, some sealing means must be provided at the ends of the plenum chamber 76. As was explained above, particularly under startup and shutdown conditions, the outer casing 40 will expand or contract due to thermal forces at a different rate than the inner casing 42. Therefore, the sealing means at the opposite ends of the plenum chamber 76 must permit this differential expansion and/or contraction and at the same time provide an effective seal due to the differential in temperature and pressure between the chamber 76 and the chambers at either end thereof.

Figure 5:
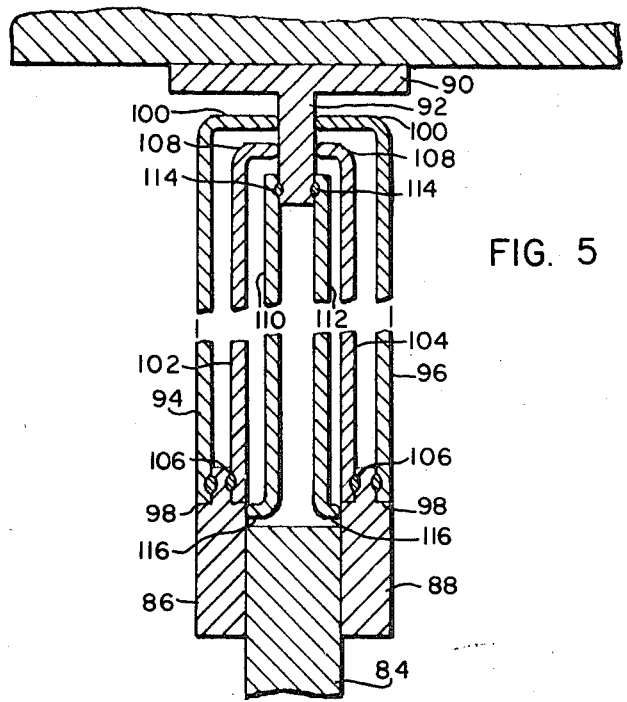
FIG. 5 is an enlarged cross-sectional view of one of the seals shown in FIG. 3.

One of the seals of the present invention is identified by the reference numeral 82 in FIG. 3 and is shown in detail in FIGS. 4 and 5. The inner casing 42 is provided with a flange 84 to which annular wearplates 86 and 88 are connected by suitable means, not shown. The outer casing 40, opposite the flange 84, has a generally T-shaped flange member 90 extending around its inner periphery and provided with a radially inwardly extending portion 92. As best shown in FIG. 5, the seal 82 is formed from a plurality of sets of L-shaped sealing elements. The first set, 94, 96 is spot-welded to grooves 98 in the wearplates 86 and 88. Each element 94, 96 has first and second cross-sectional leg portions, the shorter cross-sectional leg portions 100 being in engagement with the portion 92 of flange member 90. The sealing elements are spring-biased such that the tips of the leg portions 100 will be held in snug abutting relationship with the portion 92. A second set of sealing elements 102 and 104 is spot-welded to grooves 106 in the sides of the wearplates 86 and 88 opposite the grooves 98. These sealing elements are again L-shaped in cross section and have leg portions 108 which are held in snug abutting relationship with the portion 92 by virtue of the fact that the leg portions at right angles thereto are spring-biased. Finally, a third set of L-shaped sealing elements 110 and 112 is spot-welded to the bottom of portion 92 as at 114. Each element 100, 112 has an L-shaped cross section with a leg 116 abutting a surface on the wearplate 86 or 88. Here, again, the sealing elements 110 and 112 are spring-biased so as to urge the tips of the legs portions 116 into snub abutting relationship with the wearplates 86 and 88.

As best shown in FIG. 4, the seal 82 is divided into arcuate segments identified as 82A, 82B and 82C. This leaves seams or spaces 118 between the segments, which seams are overlapped by means of sealing strips 120. As shown in FIG. 4, each of the sealing strips is spot-welded as at 122 to an associated arcuate segment 82B or 82C, for example, and simply overlaps the seam 118 and the adjacent arcuate segment. Thus, one seal strip is spot-welded to segment 82C and overlaps segment 82B, while the other seal strip is spot-welded to segment 82B and overlaps segment 82A. In this manner, circumferential expansion or contraction of the sealing segments is permitted. At the same time, and as best shown in FIG. 5, the flange 84 and the T-shaped flange member 90 can move toward or away from each other without impairing the sealing effect by virtue of the fact that the tips of the L-shaped sealing elements are held in snug abutting relationship with associated radial surfaces on the casing 40 or 42. The seal strips 120, of course, do not provide an air-tight seal for the plenum chamber 76; however they do afford a reasonably good sealing effect, at least good enough for turbine applications.

As will be appreciated, the seams 118 shown in FIG. 4 are those for the outer set of L-shaped sealing elements 94 shown in FIG. 5. The seams in these sealing elements need not be aligned with the seams in the remaining sealing elements and are preferably displaced with respect to the others. Furthermore, sealing strips can be used on the inner sets of sealing elements 102, 104 and 110, 112 in a manner similar to that shown in FIG. 4.

With reference again to FIG. 3, at the other end of the plenum chamber 76 is a second seal 124 which again is formed from L-shaped sealing segments 126, 128 and 130. Each sealing segment 126-130 again is L-shaped in cross section, one leg of the cross section being connected to wearplate 132 or 134 and the other leg of the L-shaped cross section being spring-biased into engagement with the other wearplate. Here, again, the elements 126-130 may be formed in segments provided with seal strips in an arrangement similar to that shown in FIG. 4.

Figure 6:
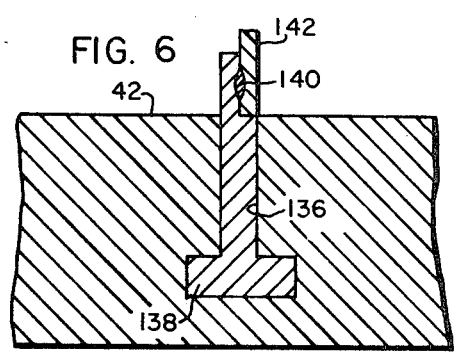
FIGS. 6 and 7 illustrate alternative embodiments of the invention.

In FIG. 6, an alternative embodiment of the invention is shown wherein the casing 42, for example, is provided with a generally T-shaped slot 136 which receives a T-shaped insert 138. The insert 138, in turn, is provided with a groove 140 which receives one leg of an L-shaped sealing element 142 similar to those previously described.

Figure 7:
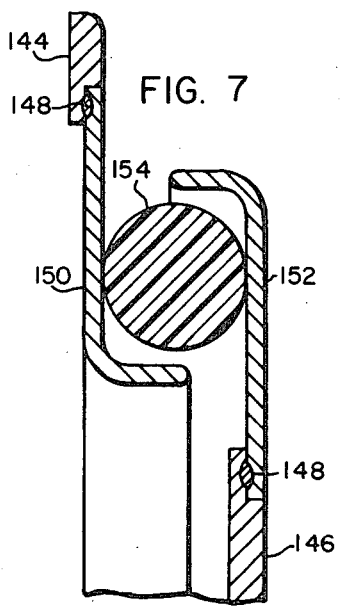

In FIG. 7, still another embodiment of the invention is shown which is provided with plates 144 and 146 connected to inner and outer casings, not shown, and provided with grooves 148 to which L-shaped sealing elements 150 and 152 are spot-welded. In this case, a high temperature O-ring packing 154 is inserted between the sealing elements 150 and 152 and held securely by virtue of the spring tension in the sealing elements. In this case, the shorter legs of the L-shaped sealing elements 150 and 152 do not engage a surface, the entire sealing action being through the O-ring packing 154.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a gas turbine, an inner stationary casing, an outer stationary casing, said casings being disposed in concentric radially spaced relation with each other, radially extending means provided on said casings securing said casings to each other, and two sets of radial sealing means extending between said inner and outer casings and disposed in axially spaced relation with each other and extending around the space between said casings to define an enclosure for coolant therebetween, one set of said radial sealing means having at least one sealing element of generally L-shaped cross-sectional configuration having a first leg portion secured to one of said casings and a second leg portion at substantially right angles to said first leg portion and in continuously biased sealing engagement at its free end with a radially-extending surface on the other of said casings, and the other set of said radial sealing means having a second sealing element also of generally L-shaped cross-sectional configuration having a first leg portion secured to said other casing and a second leg portion at substantially right angles to said first leg portion and in continuously biased sealing engagement at its free end with a radially extending surface on said one casing, the first leg portions of said sealing elements being preset whereby the second leg portions are continuously urged under spring bias into engagement with their associated radial surfaces during operation.

2. The structure of claim 1 wherein each set of radial seal means includes a second leg portion which is shorter than said first leg.

3. The structure of claim 2 wherein the respective leg portions of the sealing elements are parallel to each other and define a chamber between the elements, the second leg portion of each element being spring-biased toward the first leg portion of the other element.

4. The structure of claim 1 wherein each set includes a plurality of arcuate sealing elements extending circumferentially around the end of the enclosure defined between said casing.

5. The structure of claim 4 including seal strips covering seams between said arcuate sealing elements.

6. The structure of claim 5 wherein said seal strips are attached to an associated arcuate segment and overlap a seam and an adjacent arcuate segment.

7. The structure of claim 1 wherein each set of said radial sealing means includes a plurality of spaced sealing members superimposed one upon the other in parallel relationship.

8. The structure recited in claim 1 wherein the enclosure comprises a plenum chamber, and means is provided for supplying said plenum chamber with a gaseous pressurized cooling fluid.

9. The structure recited in claim 8 wherein said second set of seal elements is disposed in oppositely biased engagement with one of the casings thereby to maintain a seal in the event of loss of sealing abutment of said first set of seal elements due to relative movement of said casings in axially opposed directions.

* * * * *